Patented Dec. 3, 1940

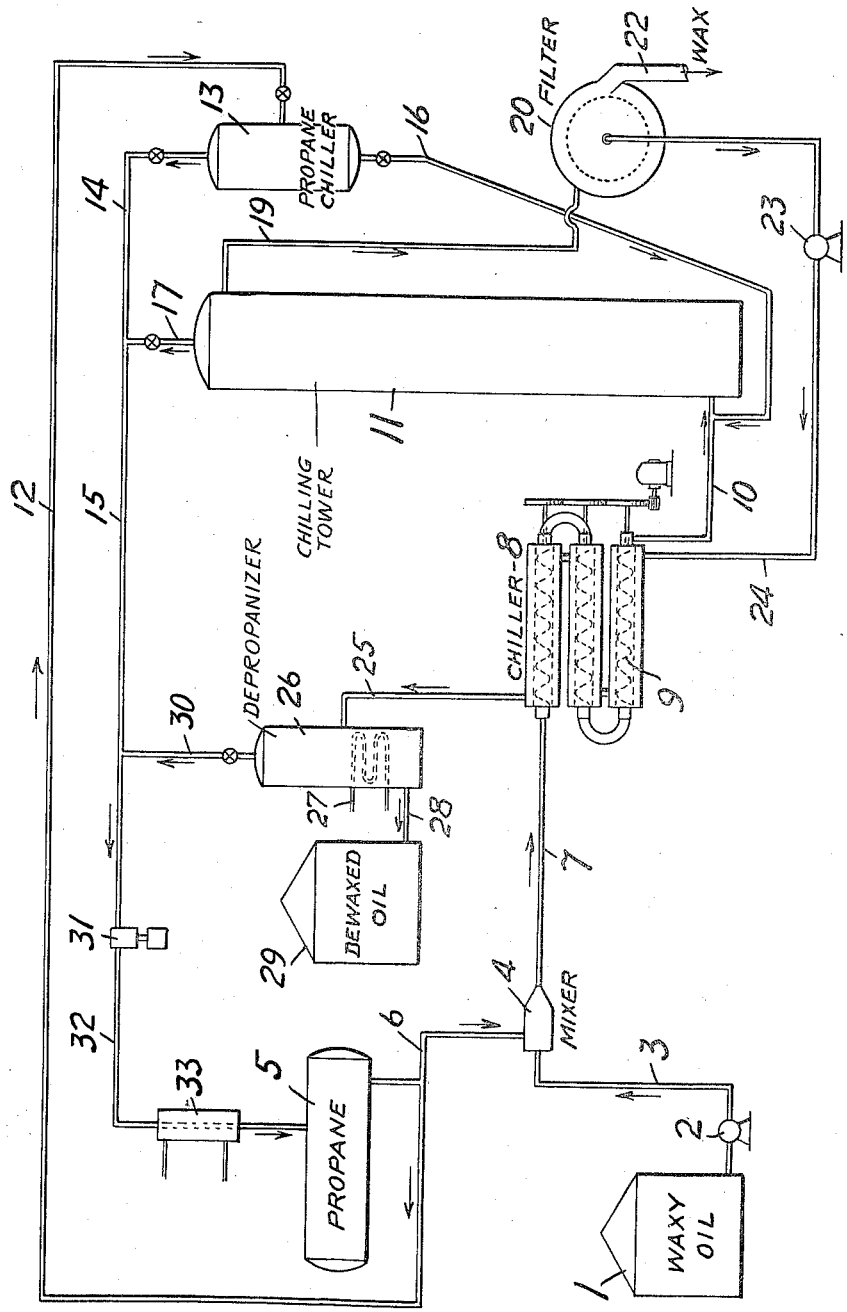

2,224,109

UNITED STATES PATENT OFFICE 2,224,109

PROCESS FOR DEWAXING PETROLEUM OILS

Walter V. Stearns, Yeadon, Pa., assignor to Sun Oil Company, Philadelphia, Pa., a corporation of New Jersey Application July 2, 1938, Serial No. 217,174

8 Claims. (Cl. 196—18)

The present invention relates to a process and apparatus for dewaxing petroleum oils by the use of liquid normally gaseous diluent refrigerants having selective wax solvent properties at low temperatures, and more particularly to a method and apparatus for effectively and properly chilling a blend of the oil to be dewaxed and the diluent refrigerant.

In the dewaxing of hydrocarbon oils, great care must be exercised in the blending and chilling of the oil and diluent in order that crystals of the proper size and structure may be formed to facilitate the subsequent separation of the crystallized wax from the blend, either by gravity separation or by filtration or other separating method.

Heretofore considerable difficulty has been experienced in properly controlling the chilling of the blend of oil to be dewaxed and the diluent refrigerant. Two systems have been employed. The first consists in making a blend of the oil to be dewaxed and the diluent refrigerant, which for the sake of simplicity will hereinafter be referred to as propane, but which may consist of butane, ethane, or mixtures of ethane, propane and butane in varying percentages and in fact other liquid normally gaseous materials such as various halogenated hydrocarbons and materials of other than hydrocarbon derivation such as $SO_2$ may be used. This blend is rich in propane, having a sufficient quantity admixed therewith not only to provide the refrigeration necessary to chill the total blend, but also to render the blend filterable at its final dewaxing temperature. The blend, under sufficient pressure to retain the propane in its liquid phase, is passed to a chilling chamber and is then chilled from its blending temperature, say 90° to 180° F. depending on the character of the oil being dewaxed, to its final dewaxing temperature say —45° to —60° F. by removing the pressure thereon in order to permit evaporation of a portion of the propane and the consequent chilling of the blend by such evaporation. Unless the pressure is removed gradually, the blend will chill too fast and proper filterable crystals will not be formed. This results in the imperfectly formed wax crystals clogging the pores of the filter cloth, thereby preventing further filtration. It has been the custom when a blend has been improperly chilled, to re-heat such blend and re-chill it properly, thus causing large losses of time and energy. It is readily apparent that great care must be exercised in reducing the pressure on such blends, and that the same must be carried out, at least to a large extent, by manual manipulation of the apparatus employed.

The second method is to chill the blend, without evaporation of any of its contained propane, by means of scraped surface heat exchangers. This method may be so controlled as to chill the blend in a reasonably satisfactory way. It is maintained under super-equilibrium pressure at all times and it cannot be readily chilled so fast by indirect refrigeration so that poorly filterable wax is formed. This method, however, has several disadvantages. It requires that the chilling medium must be about 10 to 30° F. colder than the final temperature at which filtration is to occur. It is, therefore, apparent that the filtrate will not have sufficiently low heat content to chill the blend passing through the filter. This deficiency is made up in some cases by chilling additional propane in an external system for additional refrigeration. If, for instance, the mixture is to be filtered at —45° F. and at about atmospheric pressure, it must be passed in heat exchange with a refrigerating medium between —60 and —70° F. If propane is used as a refrigerant, such propane must be expanded under a vacuum equivalent to 10 to 18 inches of mercury or the filtrate must be further chilled by reducing its pressure and permitting it to cool to —60 to —70° F.

If a wash medium is used in the filtration process, and both the filtrate and wash liquid are reduced in pressure, sufficient refrigeration can be recovered in order to chill the blend to be filtered at —45° F. This method, however, is open to objection in that large amounts of propane must be evaporated to provide a refrigerating medium at —70° F. in order to cool the blend to be filtered to —45° F.

A combination of two methods is sometimes used in which the first portion of the chilling is carried out in scraped surface heat exchange apparatus, and the final chilling is obtained by the first method, that is, passing the blend into a chilling chamber, and therein reducing the pressure to that at which the blend is to be filtered.

The first procedure, and the combination of the first and second procedures are further objectionable in that they require batch operation, and the heating of the chilling chambers between batches, for if a fresh batch of blend is run into a chamber which has been chilled into final dewaxing temperature, it is immedately shock chilled to some degree by the walls of the chamber, and in order to obviate such shock chilling the chamber is usually heated up between batches by passing warm propane gas into the chamber in order to heat such chamber and condense such gas.

A third and more recent method of chilling such blends has been suggested which consists in passing the blend of propane and wax bearing oil into the bottom of a column and then permitting the propane to evaporate gradually as the blend passed up through the column and its hydrostatic pressure is reduced, the vaporization of propane in such case serving to chill the blend and the chilled solution of wax bearing oil and propane with wax crystals suspended therein is removed from the top of the column while the propane vapors are vented from the column. In carrying out such an operation several columns are used in series and the pressure at the top of each succeeding column is reduced over that of the preceding column until the pressure at the top of the final column is at the vaporization equilibrium pressure for the final dewaxing temperature. However, due to the lightness of propane and blends of propane and oil, a large number of columns are required. For instance, if it is desired to chill such a blend of propane and oil from 90° F. to —40° F. the total pressure drop will be about 150 pounds per square inch. Since the average density of propane is about 33 to 34 pounds per cubic foot, in order to obtain a hydrostatic pressure of 150 lbs. per square inch the head of liquid would have to be 630 ft. Obviously, a single column of such size is impractical and it would therefore be necessary to use seven columns approximately 90 feet high. It will thus appear that due to the large amount of equipment necessary with such a system that it is not a particularly practicable system.

A further and possibly greater objection to this type of refrigeration is that it does not permit of ready and economical recovery of the refrigeration in the filtrate without which the system becomes impractical.

The present invention involves the combination of the first method of chilling mentioned above, indirect chilling, with the third method of chilling specified above, chilling by reduction of hydrostatic head, in order that the benefits of both these methods may be utilized and, more particularly, in order to provide a method of dewaxing oil in which a greater over-all efficiency is attained than is possible by the use of either of these methods alone.

Briefly stated, the present invention comprises so controlling the amount of chilling which is performed by each method that, while the advantages of controlled chilling rate and consequent favorable wax crystal growth of the two processes used are obtained, the processes are inter-related so that more economical operation is made possible by combining them as hereinafter set forth, than is possible when using either of the processes alone.

In order to recover the refrigeration in the products from the process, a blend of wax bearing oil and propane is first chilled by indirect heat exchange with the cold products from the process. If an attempt is made to chill the blend of wax bearing oil and propane to a temperature too closely approaching that of the cold products from the process, the rate of chilling in the indirect chillers becomes so low and such a large chiller installation is required that the consequent increase in the expense of installation and operation, renders such chilling uneconomical. There is, therefore, a minimum approach on the cold end of the indirect chillers, i. e. the difference between the temperature of the chilled blend of wax bearing oil and propane leaving the chillers, and the refrigerant or cold products entering the chillers, beyond which it is impractical to go. Being governed by this approach, it is impractical to attempt to chill the blend by indirect heat exchange nearer than 15° F. to the temperature of the cold products from the process. Theoretically, the operation of the indirect chillers becomes more efficient as the approach at the cold end of the chillers increases. However a maximum limit is placed on this approach by the amount of chilling which it is practical to accomplish by means of direct chilling or reduction of hydrostatic head, on the liquid being chilled, below the vaporization equilibrium pressure of the blend, since if too much chilling is left to be done by direct chilling, the column of liquid necessary to effect such chilling becomes so high as to be impractical, and furthermore, as the amount of direct chilling increases beyond a certain maximum, the amount of refrigeration in the cold products from the processes, which becomes unrecoverable, increases rapidly. In addition, with too great an approach on the cold end of the indirect chillers, the rate of chilling throughout but particularly on the cold end, becomes so high as to result in the formation of poor wax crystals. Being thus governed by the operation of the direct chilling process, it becomes impractical to maintain an approach greater than 45° F. on the cold end of the indirect chilling. Between these limits of 15° F. and 45° F., approach on the cold end of the indirect chillers, the two processes of chilling are so inter-related that they are combined to form a unitary process operating with higher efficiency than either of the processes alone, while at the same time ease of control and readily separable wax crystal growth are attained. Another advantage which is attained by thus combining the two processes, which is not attainable by either process alone, is that a higher overall rate of chilling is possible by means of the combined process. In addition, it is possible when using direct chilling by reduction of hydrostatic head on the blend being chilled, to have the final chilled blend at a sufficient height that the blend with precipitated wax crystals therein may be fed to the filter or other wax separating means by gravity without the necessity of any pumps or other mechanical agitation which would destroy the desirable crystals obtained by the controlled chilling. Other advantages obtainable by the present combination will be apparent as the description progresses.

It will be understood that by indirect chilling is meant chilling of a substance without direct contact with the chilling agent, and by direct chilling is meant that chilling which is effected by direct contact of the substance with, or its intimate mixture with, the chilling agent.

It is therefore an object of the present invention to provide a continuous method of chilling blends of oil and liquefied normally gaseous hydrocarbons in which a use is made of the refrigeration obtainable from the cold products from the dewaxing operation and in which only the final chilling is effected by reducing the pressure on the material being chilled.

A further object of this invention is to provide a method of dewaxing in which indirect chilling is combined with direct chilling in an economical and practical manner.

Other and further objects will be apparent as this description progresses.

For a better understanding of the present invention reference should be made to the accompanying drawing, the single figure of which is a diagrammatic flow chart of apparatus suitable for practicing the present invention.

Referring now to the drawing, wax bearing oil from tank 1 is withdrawn therefrom and forced by pump 2 to line 3 to mixer 4, where it is mixed with liquefied propane withdrawn from storage tank 5 and passed through line 6 to the mixer 4. This mixing is preferably carried on at a sufficiently elevated temperature to insure a uniform blend of wax bearing oil and propane and under a super-equilibrium pressure. The thus formed blend of wax bearing oil and propane flows through line 7 to the indirect chiller 8 where it is chilled by indirect heat exchange with cold products from the process passing through the outer chambers of the chillers. The surface of the inner chambers of the chillers through which the material to be chilled flows is preferably scraped by some mechanical means such as the screw conveyors 9, diagrammatically indicated in the drawing, in order to prevent wax crystals remaining on the walls of the chillers and thus decreasing the rate of heat transfer through the walls. The blend of oil and propane is chilled to as low degree as is economically practical by indirect heat exchange with the cold products from the process, care being exercised that the rate of chilling does not exceed a rate which is favorable to formation of wax crystals of filterable size.

The thus chilled blend flows from the last pass of the chillers 8 through line 10 to the bottom of tower 11.

During the chilling by indirect heat exchange it is frequently desirable to chill a blend having a relatively low ratio of propane to oil since when chilling such a concentrated blend the throughput and consequently the size of the scraped surface chillers can be decreased, and in addition it has been found that with many stocks the growth of readily separable wax crystals is favored by such a blend. Consequently it may be necesssary or desirable to dilute the partially chilled blend from the scraped surface chillers and before it enters the tower 11. Propane for this purpose may be withdrawn from storage tank 5 and flowed through valved line 12 to propane chiller 13 wherein it may be chilled to approximately the temperature of the blend leaving the chillers 8 by vaporization of a portion of the propane, the vapors being removed from the propane chiller 13 through line 14 to manifold 15 and thence being returned to storage as hereinafter explained. The chilled liquid propane is withdrawn from propane chiller 13 through valved line 16 and is mixed with the partially chilled blend from chillers 8 in line 10 to give the desired dilution ratio of propane to oil entering tower 11.

The tower 11 is of such height that the column of liquid therein will have a hydrostatic pressure equal to the pressure reduction necessary to effect the final chilling of the blend. Thus, as the propane blend of propane and oil with wax crystals suspended therein rises through tower 11, the hydrostatic head of propane thereon decreases and thus permits a portion of the propane to evaporate and chill the remainder of the blend. The pressure maintained on the top of tower 11 will be equal to the vaporization equilibrium pressure of the blend at the temperature desired. The propane vapors are separated from the blend of chilled oil and liquid propane at the top of tower 11 and are removed therefrom through valved line 17. The chilled blend of oil and propane, with wax crystals suspended therein is removed from tower 11 through line 19 and passed to the filter 30 wherein the oil and propane solution passes through the filter surface and is removed therefrom through line 21 while the wax crystals collect on the filter surface and are removed therefrom through chute 22. The cold solution of oil and propane removed from the filters through line 21 is forced by pump 23 to line 24 to the outer jacket of the chillers 8 and flows serially therethrough in a counter direction to the flow of waxy oil and propane being chilled, thus serving to chill the blend by indirect heat exchange and to warm the solution of oil and propane which is removed from the first of the chillers 8 through line 25 and flows to the propane vaporizer 26 wherein any propane vapors generated by the heating of the solution of oil and propane in chillers 8 are separated from the liquid propane and oil, the oil being further heated if necessary by steam coils 27 to vaporize substantially all the propane contained in the oil, the depropanized oil being removed from depropanizer 26 through line 28 to dewaxed oil storage tank 29. The propane vapors from the depropanizer 26 are removed therefrom through valved line 30 to manifold 15 and flow therethrough to compressor 31 wherein they are compressed and thence flow through line 32 and through condenser 33 to propane storage tank 5.

For the purpose of better illustrating but not limiting the invention the following specific example is given:

Waxy oil from tank 1 and liquid propane from tank 5 are mixed in the mixer 4 in the desired ratio, generally one volume of oil to between one and two volumes of liquid propane. The temperature at which this mixing may be carried out may vary from atmospheric temperature to 90 to 180° F., the exact temperature being determined by the characteristics of the oil and by the uniformity of blend which it is necessary to obtain for satisfactory chilling. The warm blend enters the scraped surface chillers 8 and is cooled by indirect heat exchange with cold products from the process while passing therethrough. As a general rule the blend is chilled by indirect heat exchange to a temperature of from 0° F. to —30° F. so that the chilled blend enters the bottom of the tower 11 at this temperature. Additional chilled propane at a temperature corresponding to that of the chilled blend leaving the indirect chillers 8 is added at this point in order to supply sufficient propane for vaporization in the final direct chilling, and also to insure a blend of proper dilution for ready filtration. The amount of propane added at this point will, of course, vary with the type of oil being dewaxed and also with the amount of chilling to be done in the tower 11. However, as a general rule propane is added in amounts sufficient to give a ratio of propane and oil of substantially 5 or 6:1 in the blend entering the tower 11. The tower 11 is of sufficient height and a sufficient height of liquid is maintained therein so that the hydrostatic pressure at the bottom of the tower is substantially equal to or greater than the vaporization equilibrium pressure of the blend at the temperature at which it leaves the indirect chillers 8. As the blend rises in the tower 11, the reduction of hydrostatic pressure thereon permits a portion of the propane in the blend to vaporize and thereby chill the blend. The upward flow of the blend in tower 11 is controlled to such a rate that the blend will be chilled at a rate favoring the growth of readily separable wax crystals.

At the top of tower 11 the vapors are separated from the blend and removed through valved line 17, the vapor pressure on top of the tower being maintained at the vaporization equilibrium pressure of the blend at the final desired dewaxing temperature by venting vapors through line 17. This final dewaxing temperature may vary from —40° to —45° F., in which case a pressure closely approximating atmospheric pressure may be maintained at the top of tower 11, to —60° F. or lower, so that it will be necessary to maintain a vacuum at the top of tower 11. The chilled solution of oil and liquid propane with wax crystals suspended therein is removed from the top of the tower 11 through line 19 to the filter, or other wax separating means, 20, wherein the precipitated wax is separated from the oil and propane. It is to be noted that the top of tower 11 is sufficiently elevated above the filter 20 so that the filter may be fed entirely by gravity, and the head of the chilled mixture to be filtered removed from the tower 11 in line 19 is sufficient to enable the use of pressure filtration. The cold solution of oil and propane passing through the filter surface is conducted to the indirect chillers 8 where it passes in counter-current flow to and in indirect heat exchange relation with the blend being chilled and partially chills this blend and is itself heated. The cold solution entering the chillers 8 will then be at substantially the temperature of the blend withdrawn from the top of the tower 11, except for a possible increase in temperature of several degrees due to the absorption of heat from the atmosphere. However, if vacuum filtration is employed, the temperature of the blend entering the indirect chillers 8 may be considerably lower than the temperature at the top of the tower 11. In either event a temperature differential or approach between the chilled products to the indirect chillers and the partially chilled blend leaving the indirect chillers of between 15° to 45° F. and preferably of approximately 30° F. is maintained at the cold end of the chillers to insure efficient operation. A smaller temperature differential or approach may be maintained, but it is to be noted that one of the advantages of the present system is that a greater temperature differential or approach may be maintained at the cold end of the indirect chillers than is ordinarily possible when such chillers are used exclusively.

Among the advantages which are attained by practicing my invention is a great increase in the filter rates obtainable when oil to be dewaxed is chilled in accordance with the present invention. This increase in filter rates has been as high as 400% over the filter rates obtainable on the same stock when wholly indirect chilling is employed. I believe that one of the reasons for improvement in the filterability of the cold oil wax propane mixture obtained by my process is that during the final chilling of the mixture the wax crystals are free of mechanical agitation. Thus when indirect chilling permits the use of filter rates conducive to the formation of readily filterable crystals, the fact that the surface of indirect chillers must be mechanically scraped to continuously remove any accumulation of wax crystals thereon, results in the deformation of the crystals to an extent which impairs the filterability of the mixture. In accordance with the present invention such mechanical handling of the blend during its final chilling is avoided and, therefore, a crystal structure is obtainable which is most readily filtered.

It is to be understood that various modifications may be made in practicing my invention without departing from the spirit or scope thereof. In particular, it is to be noted that while propane has been referred to throughout as the diluent refrigerant used in the liquid, other normally gaseous refrigerants may be employed, and in fact it is possible to employ as refrigerants various substances which are normally liquid at atmospheric temperature pressure but which are capable of use as refrigerants.

For the purpose of the present invention, the following substances may be listed among the equivalents of propane: Commercial propane which consists of ethane, butane, ethylene, propylene, butylene, iso-butane and the like, or any of the individual components of such a mixture, various halogenated hydrocarbons and sulphur-dioxide.

What I claim and desire to protect by Letters Patent is:

1. The method of dewaxing wax-bearing oils which comprises establishing a continuously flowing stream of a mixture of wax-bearing oil and a liquid normally gaseous diluent refrigerant and flowing said stream in indirect heat exchange with a cold fluid to chill the same throughout the greater part of the temperature range to which it is ultimately chilled and thereby precipitate the greater portion of the wax therein that is ultimately precipitated, continuously flowing the highly chilled mixture into the bottom of a direct chilling zone, continuously flowing said mixture upwardly through said zone, maintaining the pressure on the top of the column of liquid mixture in said zone at the vaporization equilibrium pressure of said mixture for the desired dewaxing temperature, maintaining such column of such height that the pressure at the bottom thereof is at least equal to the vaporization equilibrium pressure of the mixture at the temperature at which it is introduced into said zone and of such height as to chill said mixture by reduction of hydrostatic head thereon and consequent vaporization of diluent refrigerant, in its upward flow through said zone, throughout a minor but substantial part of said temperature range to thereby precipitate the remaining portion of said wax and substantially improve the wax crystal formation, and continuously removing the chilled mixture from the upper part of said zone and separating the precipitated wax from said oil and said refrigerant.

2. The process defined in claim 1 in which a solution of the chilled oil and liquefied refrigerant from which the precipitated wax has been separated is utilized as the cold fluid in the indirect heat exchange step specified.

3. The process defined in claim 1 in which a solution of the chilled oil and liquefied refrigerant from which the precipitated wax has been separated is utilized as the cold fluid in the indirect heat exchange step specified and in which a temperature differential of not less than 15° F. is maintained between said cold solution and said mixture at the cold end of said indirect heat exchange step.

4. The process defined in claim 1 in which a solution of the chilled oil and liquefied refrigerant from which the precipitated wax has been separated is utilized as the cold fluid in the indirect heat exchange step specified and in which a temperature differential of not less than 15° F. and not more than 45° F. is maintained between said cold solution and said mixture at the cold end of said indirect heating step.

5. The process defined in claim 1 in which more pre-cooled diluent refrigerant, at a temperature approximating the temperature of the indirectly chilled mixture, is added to such mixture flowing into the direct chilling zone to supply adequate refrigerant for vaporization in said direct chilling and insure a blend of proper dilution for ready filtration.

6. The process defined in claim 1 in which the chilled mixture flowing from the upper part of the direct chilling zone is, without further substantial addition of refrigerant or further substantial reduction in temperature, subjected to filtration.

7. The process defined in claim 1 in which the reduction of temperature of the mixture in its upward flow through the direct chilling zone is between 15° and 45° F.

8. The process defined in claim 1 in which a solution of the chilled oil and liquefied refrigerant from which the precipitated wax has been separated is utilized as the cold fluid in the indirect heat exchange step specified and in which a temperature differential of not less than 15° F. and not more than 45° F. is maintained between said cold solution and said mixture at the cold end of said indirect heating step and in which the reduction of temperature of the mixture in its upward flow through the direct chilling zone is substantially the same as said temperature differential between the cold solution and said mixture at the cold end of the indirect heating step.

WALTER V. STEARNS.